April 17, 1962 D. P. MARQUIS ETAL 3,029,617
ANTI-RATTLE SPRING FOR UNIVERSAL JOINT
Filed Aug. 26, 1960

INVENTOR.
Donald P. Marquis,
BY & Elmer R. Wagner
E. W. Christen
ATTORNEY 3,029,617
ANTI-RATTLE SPRING FOR UNIVERSAL JOINT
Donald P. Marquis, Saginaw, and Elmer R. Wagner, Bay City, Mich., assignors to General Motors Corporation, Detroit, Mich., a corporation of Delaware
Filed Aug. 26, 1960, Ser. No. 52,224
11 Claims. (Cl. 64—8)

This invention relates to universal joints, and more particularly to means for eliminating vibration and rattle in a pot-type universal joint.

In the design and manufacture of machinery and in automotive manufacture and design, universal joints are used in numerous places. In automobiles, these may be found in the drive line, in the steering assembly or in the driving axle. In many situations, sliding type universal joints are desirable, the most common of these being the pot-type universal joint. The usual construction of such joints is to provide a housing having three axial and connecting bores, the drive shaft extending into the central bore and having a trunnion and bearing cap assembly secured in the end thereof. The bearing caps are slidably received in the outer axial bores and permit both rocking and sliding movement of the drive shaft and trunnion and bearing assembly. This permits the required universal motion.

Because of the materials out of which the various parts are made, the dimensions of the parts, in addition to strength and functional requirements, must be chosen so that the parts can easily be assembled. The parts are usually made of metal and interference fits are impossible, since the assembly has to serve as a universal joint and provide both sliding and oscillating motion between the mating parts. The ability to assembly these parts dictates the minimum clearances which may be used, and manufacturing practices govern the minimum tolerance range of each of the parts. These clearances appear in the assembled universal joint as angular lost motion. This lost motion can be both felt and heard and may be described as a "click," most noticeable when the universal joint is operating at a low joint angle.

The device in which this invention is embodied overcomes the angular lost motion and resulting noise as above-described. The device comprises, generally, a conventional pot-type universal joint having a bored pot and a shaft and trunnion and bearing assembly received in the bores. A spring member is disposed between the inner surface of the pot housing and the trunnion and bearing assembly to bias the trunnion and bearing assembly against the opposite surface of the interior of the pot, taking up the manufacturing tolerances and minimum clearances. This very effectively eliminates the angular lost motion and maintains a contact between the trunnion and bearing assembly and the interior of the pot at all times.

These and other advantages will become more apparent from the following description and drawings, in which.

Figure 1:
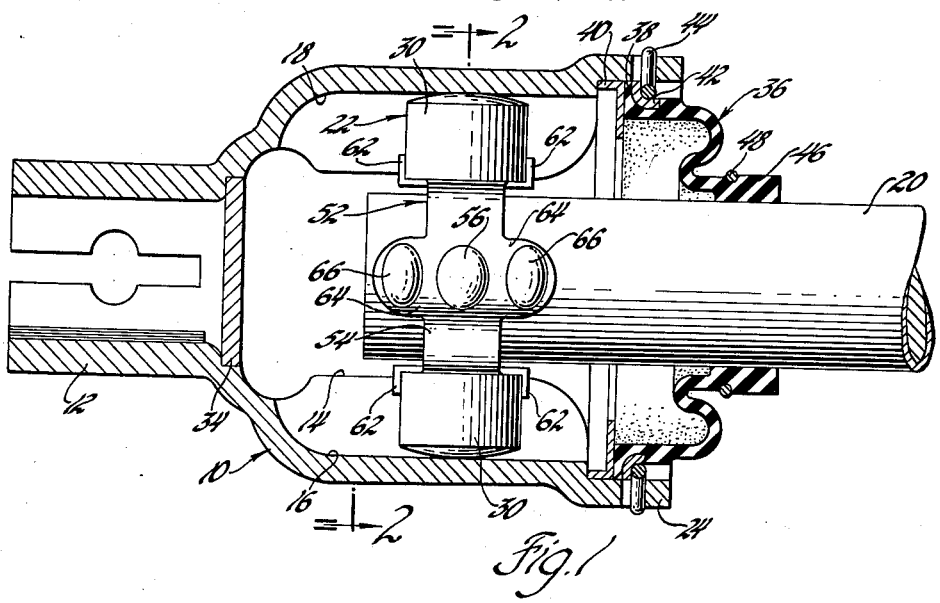
FIGURE 1 is an elevational view of a pot-type universal joint embodying the invention with parts broken away and in section to illustrate the position of the various parts.

Referring more particularly to the drawings, the universal joint may be best described with reference to FIGURES 1 and 2. The joint is shown to include a housing or pot, illustrated generally by the numeral 10, the pot having an extension 12 at one end thereof to serve as connecting means for shaft portion, or to whatever member the universal joint is to be connected to. Housing 10 includes a central axial bore 14 and connecting axial bores 16 and 18 to receive a shaft member 20 and a trunnion and bearing assembly, illustrated generally by the numeral 22. Pot 10 also includes a flange 24 which may also serve as a connecting means.

Shaft member 20 extends into the central bore 14 in the housing 10 and may be of any suitable construction, such as a single piece shaft or a shaft and sleeve combination such as illustrated. A cross pin or trunnion 26 is received in a suitable bore 28 in the shaft member 20 and extends generally transversely of the pot 10 and into the outer axial bores 16 and 18. Bearing caps 30 are received on the outer ends of the cross pin or trunnion 26, having a cross-sectional configuration which is substantially the same as the cross-sectional configuration of the axial bores 16 and 18. Bearing caps 30 may be spring biased outwardly by Belleville springs or the like 32, although this is not necessary as will be hereinafter described. Furthermore, bearing caps 30 may be rotatable about the cross pin or trunnion 26 and may have an annulus of needle bearings, not shown, as is the conventional practice.

In order to seal the housing 10 from dirt and other foreign materials and to permit retention of lubricant in the housing 10, a welsh plug or the like 34 may be provided at the closed end of the housing 10. A boot, illustrated generally by the numeral 36, may be provided at the shaft end of the housing 10. Boot 36 is provided with an annular flange 38 which may be clamped in place between retaining rings 40 and 42 by a snap ring 44. However, any conventional retaining means may be provided in place of that illustrated. The opposite end 46 of the boot 36 closely surrounds the shaft 20 and is held in place by a snap ring or the like 48. Thus, the housing 10 is effectively sealed at both ends.

Figure 2:
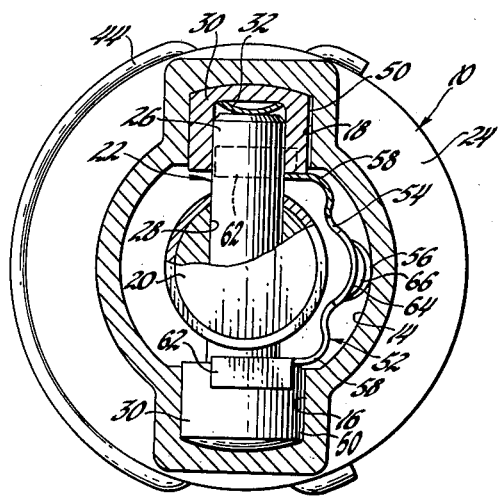
FIGURE 2 is a cross-sectional view of the universal joint illustrated in FIGURE 1, taken substantially along the line 2—2 of FIGURE 1 and looking in the direction of the arrows.
Figure 3:
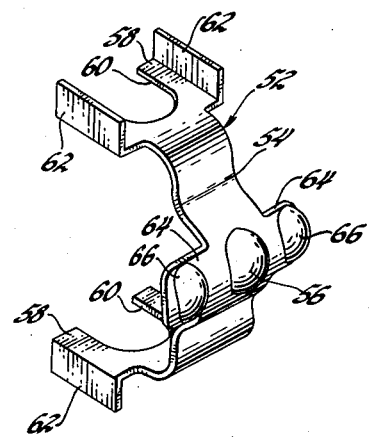
FIGURE 3 is an isometric view of the spring member utilized in the universal joint of FIGURES 1 and 2.

It may be noted in FIGURE 2 that a clearance 50 exists between the bearing caps 30 and the inner surface of the axial bores 16 and 18. This clearance represents the total manufacturing tolerances and minimum clearances that are to be taken up to prevent the vibration and noise in the joint. This is accomplished by means of an anti-rattle spring, illustrated generally by the numeral 52. Spring 52 includes a body portion 54 extending generally transversely of the pot member 10 and disposed within the housing 10. Body portion 54 may be provided with a projection 56 which engages the inner surface of the central axial bore 14. Body portion 54 terminates in spaced leg portions 58, each of which is provided with a U-shaped slot 60 permitting the legs 58 to straddle the cross pin or trunnion 26 on opposite sides of shaft 20. It may be seen from viewing FIGURE 2 that the spring 52 provides a biasing force between the inner surface of the housing 10 and the trunnion and bearing assembly 22 to bias the assembly against the opposite side of the axial bores 16 and 18. This effectively takes up the tolerances and clearances between these parts. The resulting clearance, as illustrated by the numeral 50 in FIGURE 2, represents twice the amount of clearance and tolerances taken up by the spring member 52.

Legs 58 of spring member 52 may be provided with upstanding spaced flanges 62 which are adapted to lie on opposite sides of the bearing caps 30. This positively locates the spring and the bearing caps with respect to the shaft 20 and the housing 10. Spring 52 may be constructed so as to provide a radially outward biasing force by the legs 58, thus biasing the bearing caps 30 against the upper surfaces of the bores 16 and 18. This may take the place of the Belleville springs 32, or may be used in conjunction therewith.

Body portion 54 may also be provided with arms 64, and arms 64 may be provided with projections 66. These projections and arms may be used for ease in assembly of the universal joint. The assembly would take place as follows. Shaft 20 would have the trunnion or cross pin 26 and bearing caps 30 secured therein exteriorly of the housing 10. Spring 52 would then be placed between the bearing caps and the entire subassembly led into the axial bores 14, 16 and 18 in the housing 10. The forward projection 66 would tend to bow the body portion 54 of spring 52 inwardly for ease in the engagement of projection 56 along the side of bore 14. This would also force the bearing caps 30 against the opposite sides of the bores 16 and 18 to take up the tolerances and clearances.

Thus, a universal joint is provided which effectively eliminates audible and objectionable noises due to manufacturing tolerances and clearances in the construction of the parts.

We claim:

1. In a pot-type universal joint having a housing and a shaft extending into said housing and a trunnion and bearing and bearing cap assembly mounted in the end of said shaft within said housing, a spring comprising a body portion having a bight therein, a projection formed in said bight and engaging an internal surface of said housing, a leg extending from each end of said body portion, said legs engaging said trunnion and bearing assembly and biasing said trunnion and bearing assembly against other internal surface of said housing to take up vibration and lateral movement of said trunnion and bearing assembly and said shaft within said housing.

2. The spring set forth in claim 1 and further including arms extending from said body portion and axially of said housing, said arms having projections formed therein to permit lead-in of said shaft and said trunnion and bearing assembly and said spring on assembly of said universal joint.

3. The spring set forth in claim 1 and further including a pair of spaced outwardly extending flanges on each of said legs, said flanges being receivable on opposite sides of said bearing caps to position said spring with respect thereto, and said legs biasing said bearing caps outwardly against said housing.

4. In a pot-type universal joint having a housing and a shaft extending into said housing and a trunnion and bearing and bearing cap assembly secured in the end of said shaft within said housing, a spring disposed between said housing and said trunnion and bearing assembly and including a body portion extending generally transversely of said housing and engaging one wall of said housing, said body portion terminating in spaced leg portions, each of said leg portions having an opening formed therein and being receivable about said trunnion and bearing assembly on opposite sides of said shaft, said spring biasing said shaft and said trunnion and bearing assembly to one side of said housing to take up manufacturing tolerances therein and prevent lateral movement of said trunnion and bearing assembly in said housing.

5. The spring set forth in claim 4 and further including arms extending from said body portion and axially of said housing, said arms having projections formed therein to permit lead-in of said shaft and said trunnion and bearing assembly and said spring on assembly of said universal joint.

6. The spring set forth in claim 4 and further including a pair of spaced outwardly extending flanges on each of said legs, said flanges being receivable on opposite sides of said bearing caps to position said spring with respect thereto, and said legs biasing said bearing caps outwardly against said housing.

7. A spring for a pot-type universal joint having a housing and a shaft extending into said housing and a trunnion and bearing and bearing caps assembly secured in the end of said shaft within said housing, said spring comprising a body portion extending generally transversely of said housing, a projection formed in said body portion and engaging said housing, a pair of legs extending from said body portion and having slots formed therein, said legs being adapted to surround said trunnion and bearing assembly and to bias said assembly against said housing to take up manufacturing tolerances preventing vibration and noise in said universal joint.

8. The spring set forth in claim 7 and further including arms extending from said body portion and axially of said housing, said arms having projections formed therein to permit lead-in of said shaft and said trunnion and bearing assembly and said spring on assembly of said universal joint.

9. The spring set forth in claim 7 and further including a pair of spaced outwardly extending flanges on each of said legs, said flanges being receivable on opposite sides of said bearing caps to position said spring with respect thereto, and said legs biasing said bearing caps outwardly against said housing.

10. A spring for a pot-type universal joint having a housing and a shaft extending into said housing and a trunnion and bearing and bearing cap assembly secured in the end of said shaft within said housing, said spring comprising a body portion extending generally transversely of said housing, and a pair of legs extending from said body portion and being adapted to engage said trunnion and bearing and bearing cap assembly and to bias said assembly against said housing for taking up manufacturing tolerances and preventing vibration and noise in said universal joint.

11. The spring set forth in claim 10 and further including a pair of spaced outwardly extending flanges on each of said legs, said flanges being receivable on opposite sides of said bearing caps to position said spring with respect thereto, and said legs biasing said bearing caps outwardly against said housing.

References Cited in the file of this patent
UNITED STATES PATENTS

| | | |
|---|---|---|
| 1,346,253 | Rayfield | July 13, 1920 |
| 2,147,141 | Blancha | Feb. 14, 1939 |